United States Patent

[11] 3,603,153

| [72] | Inventor | Siegfried H. A. Schmaus<br>806 Powder Mill Lane, Penfield Downs,<br>Philadelphia, Pa. 19151 |
|---|---|---|
| [21] | Appl. No. | 317 |
| [22] | Filed | Jan. 2, 1970 |
| [45] | Patented | Sept. 7, 1971 |

[54] DIRECT-ACTING PRESSURE AND VACUUM SENSOR
5 Claims, 7 Drawing Figs.

[52] U.S. Cl............................................. 73/418,
73/411
[51] Int. Cl............................................. G011 7/04
[50] Field of Search......................................... 73/418,
411, 412, 417

[56] References Cited
UNITED STATES PATENTS
1,421,501  1/1970  Kraft et al...................  73/411 X Primary Examiner—Donald O. Woodiel
Attorney—Michael Ebert ABSTRACT: A direct-acting pressure and vacuum sensor operable in the low-pressure range and constituted by two cantilever springs having different lengths and spring rates. The two springs have a similar C-formation and are maintained one within the other, in spaced relation, both springs have being attached at one end to a socket. The free ends of the springs terminate in a cap from which a pointer is extended. The springs are sealed within a flexible envelope to define an internal chamber communicating with the socket, whereby pressure applied thereto causes the springs to deflect, thereby moving the pointer to indicate pressure.

PATENTED SEP 7 1971    3,603,153

LARGER EFFECTIVE AREA
SMALLER EFFECTIVE AREA

INVENTOR.
SIEGFRIED H.A. SCHMAUS
BY
ATTORNEY 3,603,153

DIRECT-ACTING PRESSURE AND VACUUM SENSOR

BACKGROUND OF INVENTION

This invention relates generally to direct-acting pressure and vacuum sensors, and more particularly to a pressure gauge of the elastic type which is operable in the low-pressure range.

Measurement of absolute pressure, gauge pressure, vacuum and draft pressures, and differential pressure, is carried out by two primary types of pressure-sensitive elements, the first being the liquid column in which the height and density of the liquid are utilized to measure pressure, and the second being the elastic pressure device. The sole concern of the present invention is with elastic pressure elements which are designed to follow the physical law that within the elastic limit, stress is proportional to strain; hence deflection is proportional to applied pressure.

The Bourdon tube, because of its stability, simplicity and high pointer torque, is widely used as a pressure or vacuum indicator or controller. The operation of the Bourdon tube is base on the principle that an elastic tube having an internal cross section that is not a perfect circle, if bent or distorted, has the property of changing its shape with internal pressure variations. This internal pressure causes the cross-sectional form to become more circular, giving rise to a motion of the closed end of the tube if the open end is rigidly fixed. This motion is called "tip travel".

The Bourdon tube comes in three main types. The C-type is formed by winding the tube to define a segment of a circle, whereas the spiral type is created by winding more than one turn of the tube in the shape of a spiral about a common axis. The helical type is created by winding several turns of the tube in the shape of a helix. A Bourdon spring in any of the existing types can be made from any metal or alloy which exhibits satisfactory elastic qualities.

While Bourdon types of the "C", spiral, or helical type are capable of operating within various pressure ranges running as high as p.s.i., in no instance is it possible as a practical matter, to operate such tubes below 12 or 15 p.s.i. Hence, despite the advantages of Bourdon tubes, they are not effective as gauges in the low-pressure range.

SUMMARY OF INVENTION

In view of the foregoing, it is the primary object of this invention to provide a direct-acting pressure and vacuum sensor of the elastic type, which is capable of operating in the low-pressure range.

The need for inexpensive pressure sensors in the low-pressure range is widespread. Thus the need exists for such devices in the following applications, among others:

a. Pressure gauge for motor-boat speedometer;
b. Air Gauge;
c. Receiver gauge for process control;
d. Low-pressure switches;
e. Level indicators;
f. Vacuum Gauge A more specific object of the invention is to provide a simple, stable and reliable pressure and vacuum sensor which may be manufactured at low cost, the sensor being responsive to low-level pressure or vacuum values to carry out indicating or control functions.

Briefly stated, these objects are accomplished in an elastic device for sensing or measuring low-pressure levels, the device being constituted by two cantilever springs of different length and spring rate, the two springs having a similar C-formation and being maintained, one within the other, in spaced relation. The spaced springs are sealed within a flexible sealed within a flexible envelope to define an internal chamber, one end of the two springs being attached to a fixed socket communicating with the internal chamber, the free end terminating in a cap from which a pointer extends. Pressure applied through the socket causes deflection of the pointer to an extent depending on the level of pressure.

OUTLINE OF DRAWING

For a better understanding of the invention, as well as other objects and further features thereof, reference is made to the following detailed description to be read in conjunction with the accompanying drawing, wherein:

FIG. 1 schematically illustrates, in side view, a direct-acting pressure and vacuum sensor in accordance with the invention;

DESCRIPTION OF INVENTION

Figure 1:
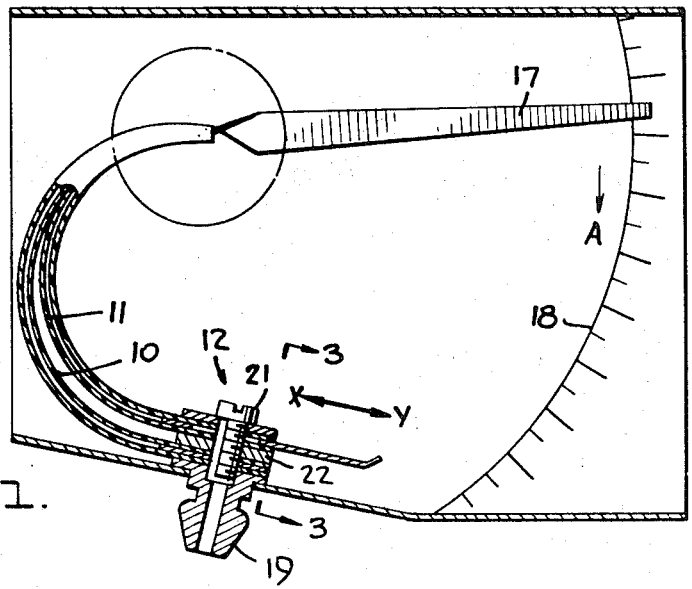
Figure 2:
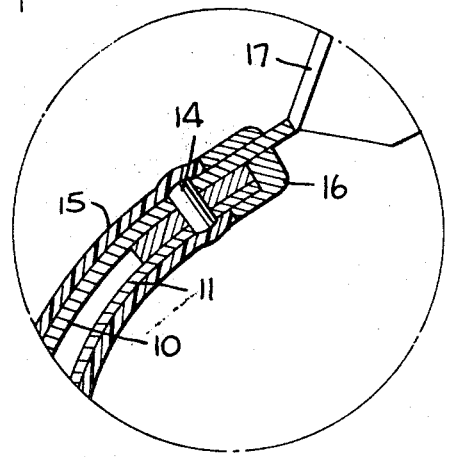
FIG. 2 is an enlarged view of that portion of the device in FIG. 1 which is encircled.
Figure 4:
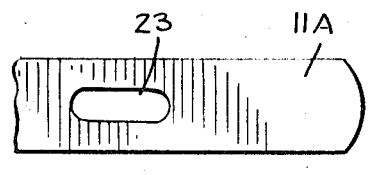
FIG. 4 is a plan view showing the end extension of the inner spring.

Referring now to the drawing, and more particularly to FIG. 1, a pressure or vacuum sensor in accordance with the invention comprises two basic flat springs 10 and 11, both having the same width but differing in thickness and in length so that the springs, which may be made of any suitable metal or alloy of the types currently in use in Bourdon tubes, have different spring characteristics and rates.

Figure 3:
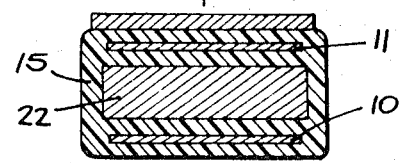
FIG. 3 is a section taken along the line 3—3 in FIG. 1.

Springs 10 and 11 are maintained in spaced relation and are attached at one end to a socket generally designated by numeral 12. The springs both have a similar C-configuration, the free ends thereof being separated by a square, thin washer 13 and being interconnected by a pin 14 passing through the washer. The springs are enclosed and hermetically sealed within a flexible, tubular envelope 15 having a rectangular cross section, as best seen in FIG. 3. The envelope is formed of a soft elastomer or thin-wall plastic which is compatible with the process or environment.

The free ends of the springs terminate in a cap 16 from which extends a pointer 17 which is movable along a calibrated scale 18. In practice, pointer 17 may be constituted by an extension of spring 10.

Socket 12 includes a coupling head 19 communicating with the internal pressure chamber 20 defined by the space between springs 10 and 11. The springs are secured to the socket by means of a screw 21 which passes through a spacer 22 whose thickness establishes the distance between the two springs.

Figure 5:
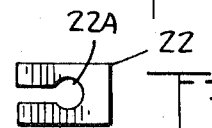
FIG. 5 shows the spacer in plan view.
Figure 6:
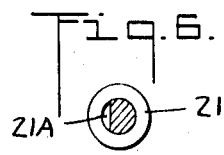
FIG. 6 shows a section taken through the socket screw.

Spacer 22, as best seen in FIG. 5, is provided with a slot 22A to permit the passage of fluid into chamber 20. For the same reason, screw 21, as best seen in FIG. 6, has a flattened portion 21A so that fluid entering the duct in coupling head 19 is not blocked by either the screw or the spacer.

Pointer 17 travels in direction A along scale 18. To adjust the travel of the pointer in direction A and to match the dial scale, spring 11 is provided with an extension 11A going beyond socket 12, the spring having an elongated slot 23 through which screw 21 passes. By shifting extension 11A in direction X, pointer motion A will be decreased, whereas by shifting it in direction Y, pointer motion A will be increased. This calibration is carried out while screw 21 is fingertight. After calibration, the gauge is hermetically sealed at the socket end.

Figure 7:
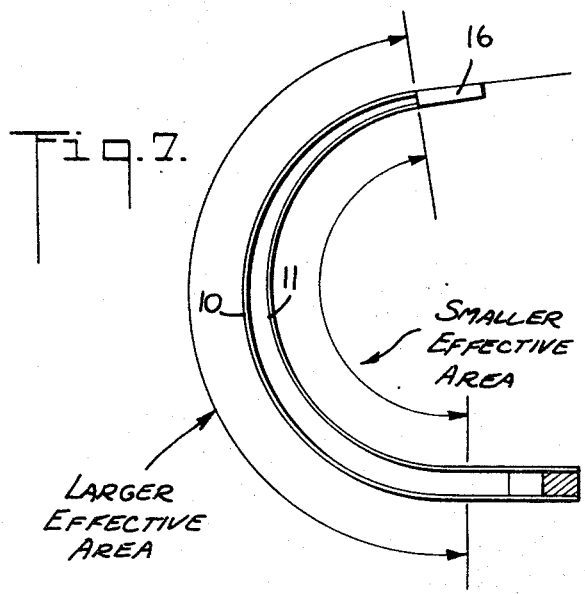
FIG. 7 illustrates the operating principles of the elastic device.

As shown in FIG. 7, the outer spring 10 is thicker and longer than the inner spring 11. Spring 11 is under tension when an external pressure is applied, the tension being released when internal pressure is applied. Because of the independent nature of the springs, the thickness of the springs may be selected to make possible different operating ranges. Because the cantilever springs are of different length and spring rate, the combined assembly, as in the case of a C-shaped Bourdon tube, is deflected as a function of applied pressure.

In the arrangement shown in FIG. 7, wherein the inner spring is thin relative to the outer spring, this device is intended for vacuum applications. But when the sensor is used for internal pressure applications, the spring arrangement is reversed whereby the thinner spring is on the outside, whereas the thicker spring is on the inside. Obviously, in either application, the thinner spring should be kept under tension. In some instances, one may operate with springs having the same thickness.

While there has been shown and described a preferred embodiment of direct-acting pressure and vacuum sensor in accordance with the invention, it will be appreciated that many changes and modifications may be made therein without, however, departing from the essential spirit of the invention.

What I claim is:

1. A direct-acting pressure sensor comprising:
   A. first and second cantilever flat springs having different lengths and thicknesses, said springs having similar C-formations and being maintained in spaced relation, the shorter being disposed within the longer,
   B. a flexible envelope surrounding said springs and sealing same to define a pressure chamber between the springs,
   C. a fixed socket attached to one end of said springs, said socket having a coupling head communicating with said chamber, and
   D. means secured to the free end of said springs to indicate the deflection thereof as a result of pressure applied to said chamber.

2. A sensor as set forth in claim 1, wherein said springs are joined together at the free end by a washer.

3. A sensor as set forth in claim 1, wherein the outer spring is extended to provide pointer means to indicate deflection.

4. A sensor as set forth in claim 1, wherein the inner spring has an extension which is adjustable in position relative to said socket to facilitate calibration.

5. A sensor as set forth in claim 1, wherein said envelope is of an elastomer material.

UNITED STATES PATENT OFFICE
CERTIFICATE OF CORRECTION

Patent No. 3,603,153           Dated September 7, 1971

Inventor(s)    S.H.A. Schmaus

It is certified that error appears in the above-identified patent and that said Letters Patent are hereby corrected as shown below:

In the Abstract, sixth line, "have" at the beginning of the line should not have been printed.

Column 1, line 40, before "p.s.i.", there should have appeared the number -- 100,000 --

Signed and sealed this 18th day of April 1972.

(SEAL)
Attest:

EDWARD M. FLETCHER, JR.          ROBERT GOTTSCHALK
Attesting Officer                Commissioner of Patents